(12) United States Patent
Maeseele et al.

(10) Patent No.: US 11,306,632 B2
(45) Date of Patent: Apr. 19, 2022

(54) OIL DECANTATION SYSTEM FOR AN INTERNAL COMBUSTION ENGINE

(71) Applicant: NOVARES FRANCE, Clamart (FR)

(72) Inventors: Christophe Maeseele, Douvrin (FR); Christophe Pech, Paris (FR); Jerome Demangeot, Calonne sur la Lys (FR)

(73) Assignee: NOVARES FRANCE, Clamart (FR)

( * ) Notice: Subject to any disclaimer, the term of this patent is extended or adjusted under 35 U.S.C. 154(b) by 0 days.

(21) Appl. No.: 16/768,496

(22) PCT Filed: Dec. 3, 2018

(86) PCT No.: PCT/FR2018/053092
§ 371 (c)(1),
(2) Date: May 29, 2020

(87) PCT Pub. No.: WO2019/110908
PCT Pub. Date: Jun. 13, 2019

(65) Prior Publication Data
US 2020/0386131 A1    Dec. 10, 2020

(30) Foreign Application Priority Data

Dec. 5, 2017   (FR) ..................................... 1761644

(51) Int. Cl.
*F01M 13/04*     (2006.01)
*B01D 45/08*     (2006.01)
(Continued)

(52) U.S. Cl.
CPC ............. *F01M 13/04* (2013.01); *B01D 45/08* (2013.01); *F01M 13/0011* (2013.01); *F01M 13/028* (2013.01); *F01M 2013/026* (2013.01)

(58) Field of Classification Search
CPC .. F01M 13/04; F01M 13/0011; F01M 13/028; F01M 13/021; F01M 2013/026;
(Continued)

(56) References Cited

U.S. PATENT DOCUMENTS

2011/0023429 A1    2/2011   Janakiraman et al.
2012/0318215 A1*  12/2012   Copley .................. B01D 45/08
                                                            123/41.86
(Continued)

FOREIGN PATENT DOCUMENTS

FR    2984175 A1    6/2013
WO    2005052288 A2    6/2005
WO    2014160870 A1    10/2014

OTHER PUBLICATIONS

English Translation to International Search Report for Application No. PCT/FR2018/053092.
(Continued)

*Primary Examiner* — Robert Clemente
*Assistant Examiner* — Hafiz Muhammad Aamir
(74) *Attorney, Agent, or Firm* — Cantor Colburn LLP (57) ABSTRACT

The invention relates to an oil decantation system (1) comprising: (i) a separator device (6) designed to trap the oil droplets (107) that are present in a flow of a blow-by gas (110); and (ii) a jet pump (5) positioned upstream of the separator device (6) and designed to accelerate and draw the flow of the blow-by gas (110) before it enters said separator device (6).

18 Claims, 6 Drawing Sheets

(51) Int. Cl.
*F01M 13/00* (2006.01)
*F01M 13/02* (2006.01)
*B01D 46/10* (2006.01)
*B01D 45/04* (2006.01)

(58) Field of Classification Search
CPC ............ F01M 2013/0044; B01D 45/08; B01D 45/04; B01D 46/10
See application file for complete search history.

(56) References Cited

U.S. PATENT DOCUMENTS

2013/0291501 A1* 11/2013 Melde .................... B01D 45/12
 55/462
2014/0059985 A1 3/2014 Janakiraman et al.
2016/0290194 A1* 10/2016 Parikh .................... F01M 13/04

OTHER PUBLICATIONS

International Search Report for Application No. PCT/FR2018/053092.
Written Opinion for Application No. PCT/FR2018/053092.
English Translation to Abstract for FR2984175.

* cited by examiner

OIL DECANTATION SYSTEM FOR AN INTERNAL COMBUSTION ENGINE

CROSS REFERENCE TO RELATED APPLICATIONS

This application is a National Stage of PCT Application No. PCT/FR2018/053092 filed on Dec. 3, 2018, which claims priority to French patent application FR 17/61644 filed on Dec. 5, 2017 the contents each of which are incorporated herein by reference thereto.

TECHNICAL FIELD

The present invention concerns a decantation system for an internal combustion engine.

BACKGROUND

During its operation, an internal combustion engine produces leakage gases, called «blow-by» gases or «crankcase» gases, that is to say gases that are trapped in the crankcase. These gases are produced during normal operation of the engine; indeed, gases escape from the combustion chambers by passing along the piston rings and leak into the crankcase. They pass through the lower crankcase where they are loaded with oil droplets.

Blow-by gases must be evacuated from the crankcase so as not to excessively pressurize the latter.

As blow-by gases are loaded with oil droplets, they cannot be released into the atmosphere; this is prohibited by current anti-pollution standards. The blow-by gases are therefore reintroduced at the intake after getting rid of the oil droplets with which they are loaded.

It is important that the clean-up operation of blow-by gases be as efficient as possible for at least three reasons.

The introduction of the blow-by gas loaded with oil to burn them in the cylinders increases the emission of toxic particles. This deteriorates the engine performance and, eventually, this increases the oil consumption of the engine.

For this purpose, there are separator devices that clean the blow-by gases by capturing the oil droplets; these separator devices can act by decantation.

For example, there is known from document FR-A-2984175 an oil separator device operating by decantation.

To ensure that the separation operation is carried out efficiently, it is important that the blow-by gases are introduced into the separator device at a sufficient speed.

Yet, under some operating conditions of an engine, the blow-by gases are at velocities that do not allow for a satisfactory purification.

BRIEF SUMMARY

In this technical context, an object of the invention is to provide a decantation system improving the separation performances of oil droplets present in a blow-by gas. The invention concerns an oil decantation system for an internal combustion engine comprising (i) a separator device designed so as to trap oil droplets that are present in a flow of a blow-by gas and (ii) a jet pump positioned upstream of the separator device and designed to accelerate the flow of the blow-by gas before it enters said separator device.

Thus, the invention provides a decantation device that creates a suction produced by a jet pump that allows levelling or adding to the engine suction so as to allow treating the blow-by gases in the separator device with optimal efficiency.

According to several characteristics of the invention considered separately or in combination:
- the decantation system further comprises a secondary passage sealed by a movable flap, disposed in parallel with the jet pump, allowing increasing the passage area of the flow of the blow-by gas.
- the jet pump comprises (i) a tubular body, one end of which comprises a fitting for connection to a source of propellant gas and the second end of which comprises a nozzle, and (ii) a conduit disposed opposite the separator device, the nozzle opening into the conduit.
- the jet pump comprises a check valve.
- the decantation system comprises an aperture sealed by a movable flap, the aperture delimiting the secondary passage towards the separator device.
- the decantation system comprises a wall, an upstream face of which receives the conduit and a downstream face of which receives the separator device, the conduit and the separator device being in communication through an opening formed in the wall.
- the conduit is integrally molded with the wall.
- the opening made in the wall has a semi-circular upper area and a trapezoidal lower area, the upper area facing the conduit and the lower area facing the opening.
- the decantation system comprises a wall of material which extends between the external face of the conduit and the wall in which is formed the aperture forming the secondary passage.
- the movable flap is held in the closed position by gravity.
- the separator device comprises a valve provided with decantation means separating the droplets and a clean gas.

According to another aspect, the invention concerns an internal combustion engine comprising a decantation system as previously described.

BRIEF DESCRIPTION OF THE DRAWINGS

The invention will be better understood upon reading the following non-limiting description, with reference to the appended figures.

DETAILED DESCRIPTION

Figure 10:
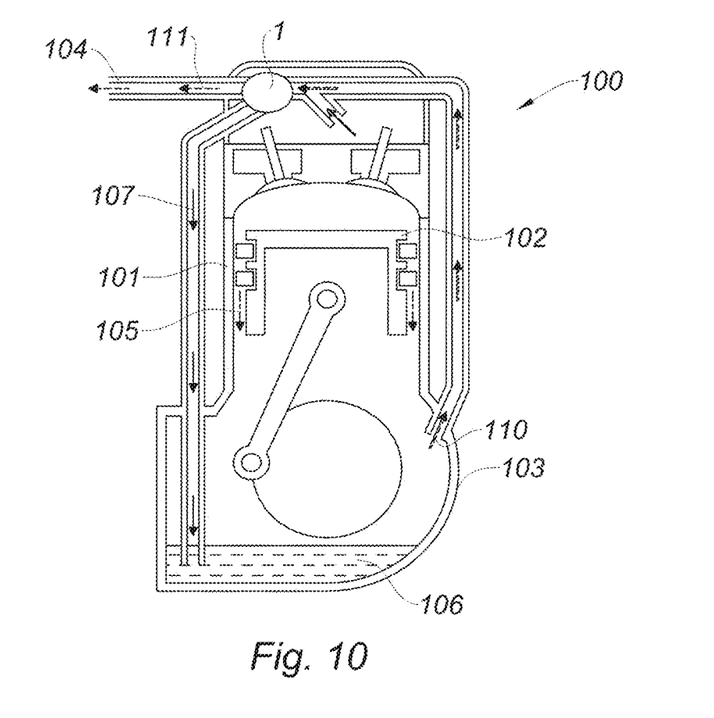
FIG. 10 shows an engine equipped with a decantation system according to the invention.

Schematically, an internal combustion engine 100 as represented in FIG. 10 comprises in particular a cylinder 101 within which a piston 102 moves, a crankcase 103 within which oil 106 splashes, and a suction duct 104. During the operation of the engine, burnt gases 105 infiltrate into the oil pan 103 passing between the cylinder 101 and the piston 102 throughout the piston's rings. Their evacuation causes a gas flow called blow-by gas 110 loaded with oil droplets collected during splashing in the oil 106.

The engine 100 is equipped with an oil separator device 1 according to the invention.

The blow-by gases 110 are routed at the inlet of the oil separator device 1 according to the invention, the latter allowing freeing the flow of the blow-by gas 110 from the oil droplets contained therein. The captured oil droplets 107 are collected and routed towards the oil pan 103 for recycling. The gaseous flow 111 freed from the oil droplets is evacuated into the air suction duct 104 of the engine.

Figure 1:
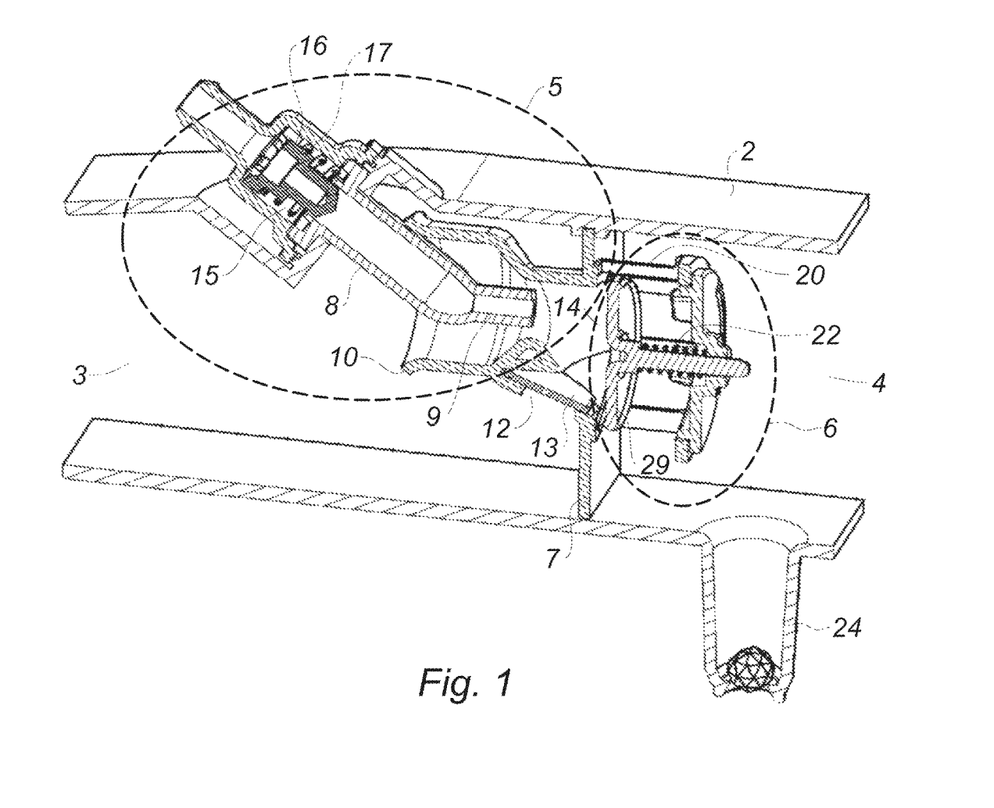
FIGS. 1, 2, 4 and 5 show, in a longitudinal sectional view, a decantation system according to several operating regimes.

Referring to FIG. 1, the oil separator system 1 according to the invention comprises a tubular body 2 having an inlet duct 3 for a blow-by gas 110 which is connected to a crankcase of an engine, an outlet duct 4 which is connected to the intake of this engine, an jet pump 5 intended to accelerate the speed of the blow-by gas 110 and an oil separator device 6 in which the blow-by gas 110 is freed from its oil droplets 107. The tubular body 2 comprises a wall 7 oriented perpendicularly to the direction of the flow. The wall 7 separates, upstream, the jet pump 5 and, downstream, the oil separator device 6. The wall 7 has an opening 14 that communicates the jet pump 5 and the separator device 6.

As shown in the figures, the separator system 1 comprises a jet pump 5 adapted to increase the speed of the blow-by gas 110 before its introduction into the separator device 6.

The objective is, to increase the oil decantation effect, by increasing the speed of the gas and, thus, the efficiency of the separator device 6.

Figure 2:
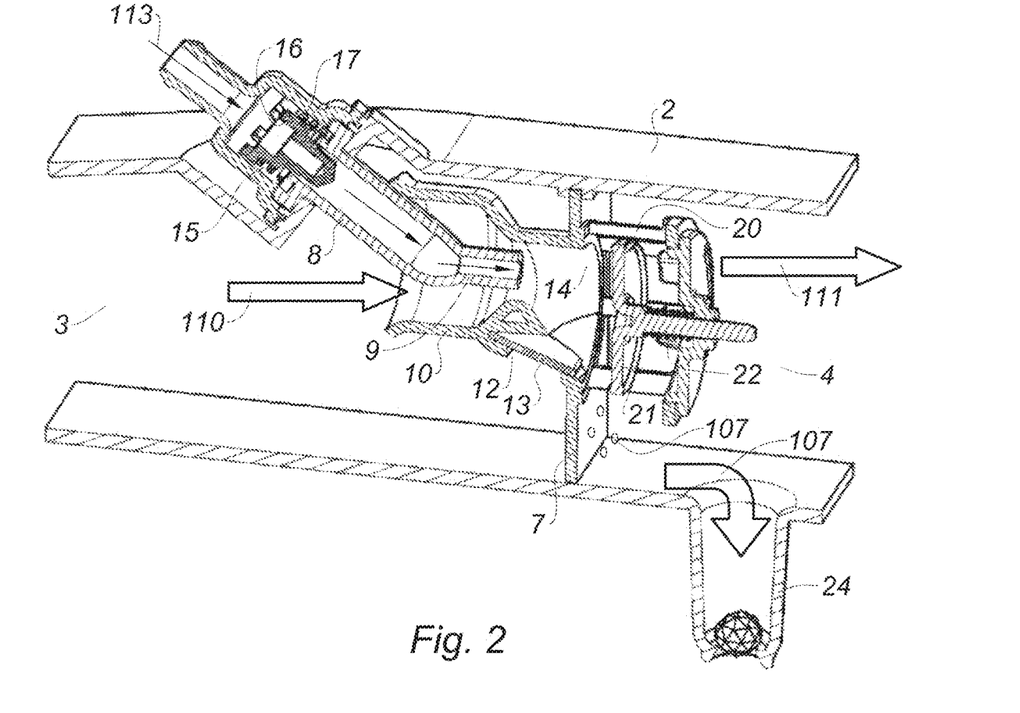

Referring to FIG. 2, the jet pump 5 operates by means of a propellant gas 113 which, in practice, comes from a branch-up made on the supercharging circuit (not represented) of the engine and which causes a gas to accelerate, namely the blow-by gas 110 which comes from the crankcase.

The jet pump 5 comprises a tubular body 8 provided with a nozzle 9 at its end. The nozzle 9 opens into a conduit 10; the conduit 10 has a conical geometry and opens itself onto the oil separator device 6.

In the example represented in the figures, the conduit 10 is integrally molded with the wall 7.

Thus, the jet pump 5 comprises a conduit 10 adapted to receive the blow-by gas 110 coming from a crankcase through the inlet duct 3 and a nozzle 9 fed with a propellant gas 113 whose end opens into the conduit 10.

One can notice the relatively simple structure of the jet pump 5 that, particularly, comprises only fixed components that can be easily inserted into the decantation system and this, without any significant extra cost.

Figure 3:
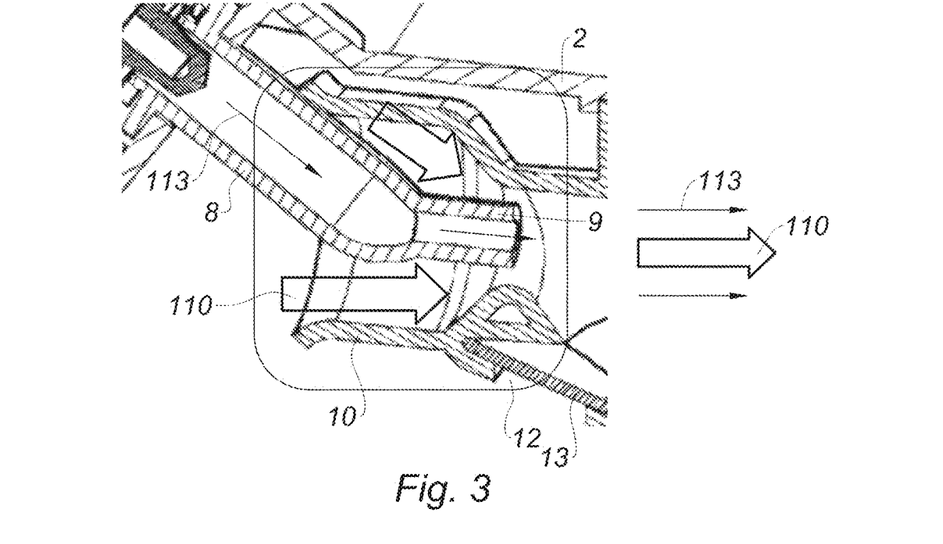
FIG. 3 is an enlarged scale view illustrating the operation of an jet pump of the decantation system according to the invention.

The nozzle 9 is, herein, connected to the supercharging circuit of the engine (not represented in the figures). The propellant gas 113, which may be branched on the supercharging circuit at a pressure in the range of 0 to 2 bars, conveys the blow-by gas 110 that circulates in the inlet duct 3. The blow-by gas 110 thus accelerated comes out of the conduit 10 with an increased speed. The acceleration effect created by the jet pump 5 is more specifically represented in FIG. 3.

The system 1 may further comprise an aperture 12 closed by a movable flap 13. The aperture 12 is disposed between the inlet duct 3 and the separator device 6 and is placed in parallel with the conduit 10. In practice, there is provided a wall made of a plastic material which extends between the external surface of the conduit 10 and the wall 7 in which the aperture 12 is formed; thus, this forms a secondary passage parallel to the main passage formed by the conduit 10.

The flap 13 may be a blade made of a plastic material which seals the aperture 12 by gravity.

The aperture 12 is branched off the conduit 10. Thus, when the flap 13 is open, the blow-by gas 110 arriving through the inlet duct 3 benefits from a secondary passage towards the separator device 6; in this manner, the blow-by gas 110 is not forced to pass exclusively through the nozzle 10.

In the embodiment of FIGS. 1 to 5, the body 8 of the jet pump 5 is provided with a check valve 15; the latter is formed by a shutter 16 pushed by a spring 17. It should be noted that the shutter 16 may have a geometry with a changing diameter so as to set the flow rate passing throughout the check valve 15 depending on the stroke of the shutter 16.

The function of the separator device 6 is to purify the blow-by gas 110 which is therefore loaded with oil droplets to convert it into a purified gas 110 adapted to be reintroduced at the intake of the engine.

The separator device 6 may have various shapes; in the illustrated embodiment of the invention, the separator device 6 is of a cylindrical type and acts by coalescence.

Thus it comprises, in particular, a body 20 bearing on the wall 7 which is disposed opposite the conduit 10 and opposite the aperture 12 so that the separator device 6 can be fed with a flow coming from the conduit 10 or coming from the conduit 10 and the aperture 12 in a combined manner.

Figure 7:
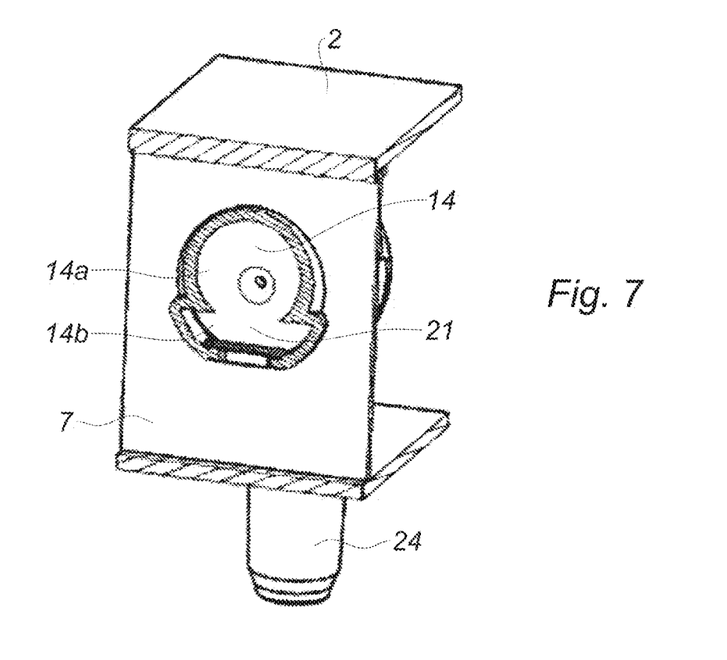
FIGS. 7 and 8 show a wall and the opening made in this wall which connects the jet pump and the decantation system.
Figure 8:
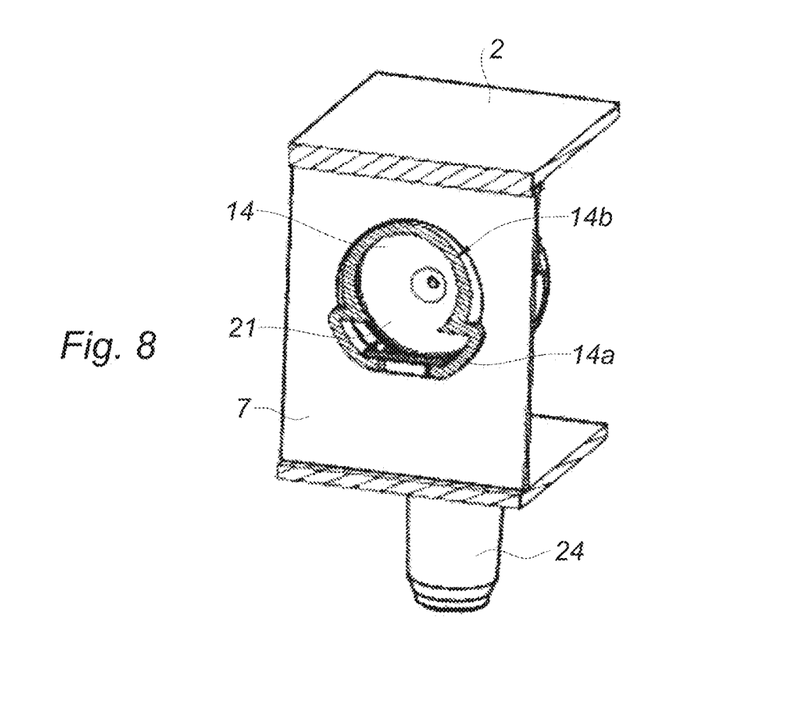

FIGS. 7 and 8 show the opening 14 of the wall 7. The opening 14 has a semi-circular upper area 14*a* and a trapezoidal lower area 14*b*.

The upper area 14*a* is located opposite the conduit 10 whereas the lower area 14*b* is located opposite the opening 12.

The operating principle of the separator device 6 is to force the gas to take a radial path.

In the embodiment illustrated in the figures, the separator device 6 has a valve 21 that is pushed by a spring 22; this configuration is represented in FIG. 7.

When a blow-by gas is brought to exert a pressure on the valve 21, this one clears away, as shown in FIG. 8, and forces the gas to take a substantially radial trajectory. The shape of the outlet duct then changes the path of the gas according to the longitudinal axis. This results in a double inflection of the gas path, around the profile of the valve 21. Between these two inflections, the oil droplets, having a greater inertia than the gas alone, follow a more centrifugal path and hit a longitudinal wall of the separator device 2 which stops them, whereas the clean gas 111 continues its course in the outlet duct 4.

The oil droplets 107 separated from the gas are collected to join the crankcase through a duct 24.

In other embodiments, the decantation device 6 may implement baffles to de-oil the blow-by gas.

The separator system 1 according to the invention may have several operating regimes which ensure a maximum efficiency.

FIG. 1 illustrates the decantation system 1 at rest, that is to say a regime in which the separator device 2 is not requested, the valve 21 therefore bears against the wall 7.

FIG. 2 shows the decantation system 1 in an operating regime in which the supercharging circuit supplies a propellant gas 113 which conveys the blow-by gas 110 and increases its speed. The propellant gas 113 pushes the valve 15 and comes into the body 8 and escapes through the nozzle 9. The valve 15 opens proportionally to the flow rate of the propellant gas 113 arriving from the supercharging circuit; thus, the propellant gas 113 is injected at the center of the conduit 10 and has a driving and acceleration effect on the blow-by gas 110 as shown more specifically in FIG. 3.

Figure 4:
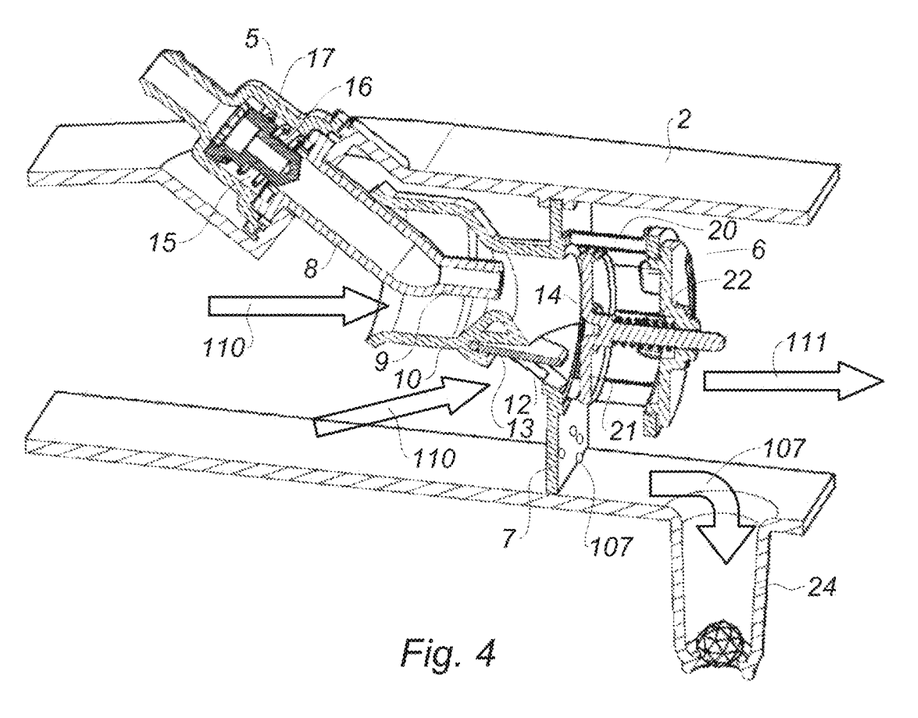

However, there may occur depending on the engine operating conditions, a regime in which the supercharging gas is not available; this can be, for example, the case of an engine operating at high output for which the entire supercharging is requested to supply the cylinders which prevents from devoting a fraction of the supercharging gas to other functions. In this case, which is illustrated in FIG. 4, the valve 15 seals the jet pump 5 and the blow-by gas 110 can, depending on the amount and the pressure at which it comes into the decantation system 1, access the separator device 6 either by passing through the conduit 10 or by passing through the conduit 10 and the aperture 12 as represented in FIG. 4. The secondary passage that is formed by the aperture 12 adjacent to the conduit 10 allows limiting the pressure drop that is created by the jet pump 5 when the latter is not in action due to the unavailability of propellant gas.

Figure 5:
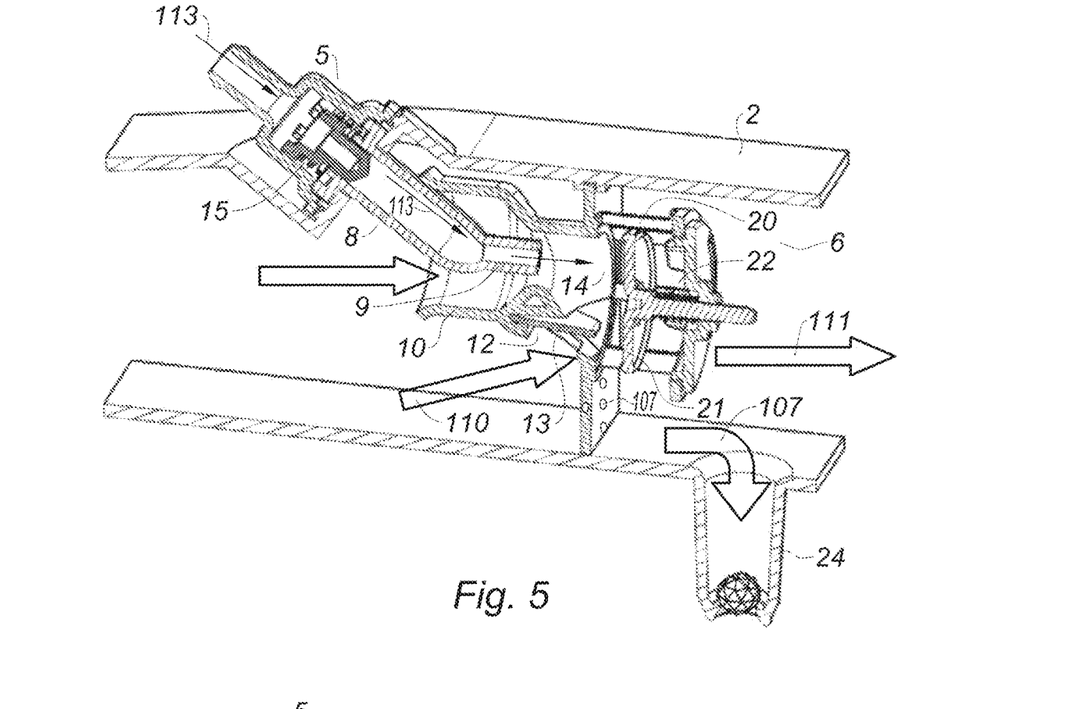

FIG. 5 shows an operating regime in which the jet pump 5 is in action and produces an acceleration of the incoming flow of the blow-by gas 110 and in which the flow of the blow-by gas 110 also passes throughout the secondary passage formed for the aperture 12.

Figure 6:
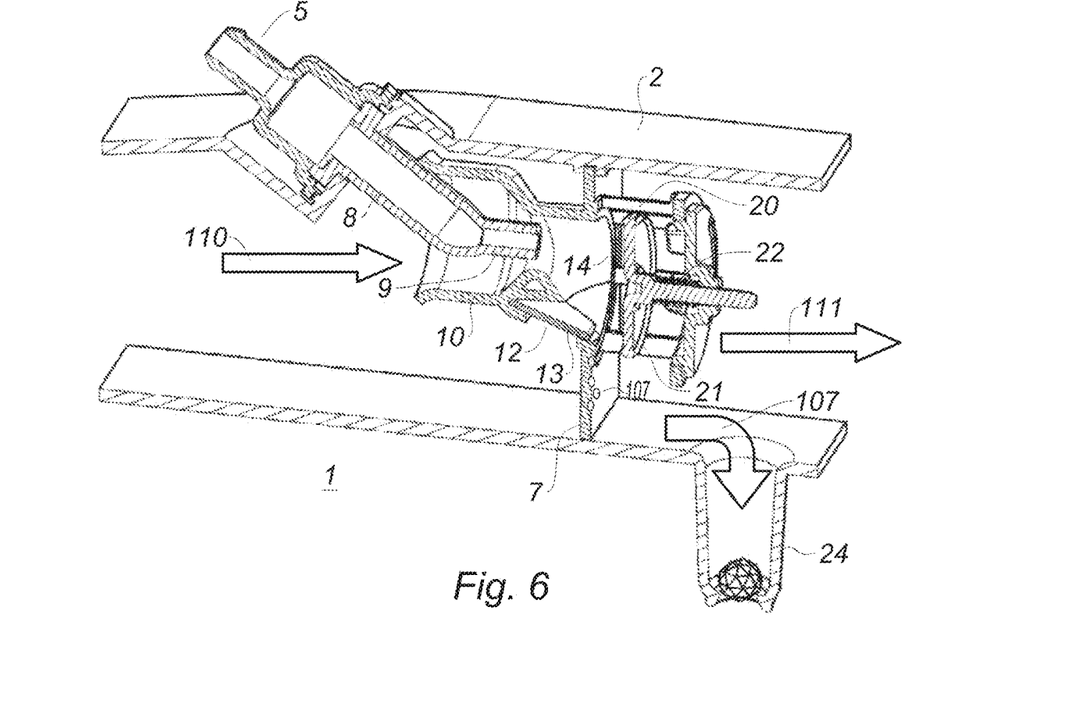
FIG. 6 represents a variant of the device shown in FIGS. 1, 2, 4 and 5.

A variant of the invention may be considered in which, as illustrated in FIG. 6, the jet pump 5 is devoid of any valve. In this embodiment, the control of the propellant gas 113 may be carried out upstream of the jet pump 5 outside the strict perimeter of the decantation system 1. It is also possible to confer to the nozzle a particular geometry allowing managing the introduction of the propellant gas.

Figure 9:
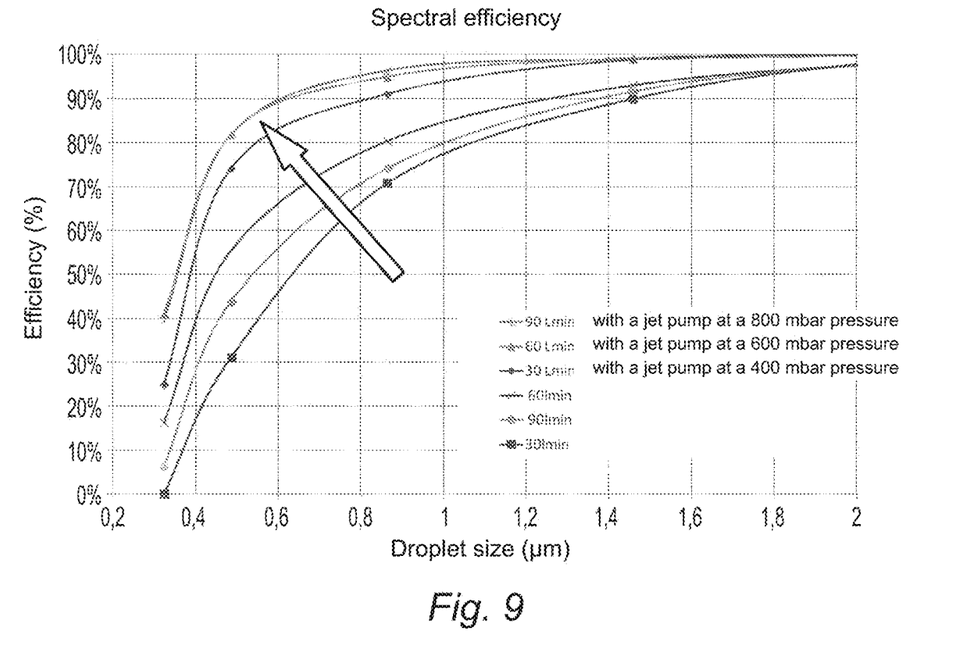
FIG. 9 is a graph showing the spectral efficiency at different flow rates of a decantation system according to the prior art and a decantation system according to the invention.

The curves of FIG. 9 clearly illustrate the improvement of the spectral efficiency of oil separation. These curves show the efficiency as a function of the diameter of the oil droplets at different flow rates. The lowest efficiency (90% for droplets with a size larger than 1.5 µm) thus observed, is measured at a flow rate of 30 L/min whereas the highest efficiency (90% for droplets with a size larger than 0.6 µm) is measured for a flow rate of 90 L/min with a propellant gas pressure from 113 to 800 mbar.

At a constant flow rate, for example 60 L/min, it is observed that the supply of propellant gas from 113 to 600 mbar allows considerably improving de-oiling for droplets of small diameters.

These curves clearly demonstrate the effect produced by the acceleration of the blow-by gas 110 generated by the jet pump 5 on the quality of de-oiling. The arrow that appears overprinted on FIG. 9 shows the efficiency curves that approach 100% and droplets of smaller diameters as a function of the increase in the pressure of the propellant gas passing through the jet pump 5.

The invention also provides a decantation device that creates a suction produced by the jet pump 5 allowing levelling or adding to the engine suction present in the duct 104. Thus, this allows creating a negative pressure in the inlet duct 3, this pressure not being negative without the use of the invention described above.

Of course, the invention is not limited to the embodiments described above as non-limiting examples.

The invention claimed is:

1. An oil decantation system for an internal combustion engine comprising:
 a separator device configured to trap oil droplets that are present in a flow of a blow-by gas; and
 a jet pump positioned upstream of the separator device configured to accelerate the flow of the blow-by gas before it enters said separator device, wherein the jet pump comprises: a tubular body a first end of which comprises a fitting for connection to a source of propellant gas and a second end of which comprises a nozzle; and a conduit disposed opposite the separator device, the nozzle opening into the conduit.

2. The decantation system according to claim 1, wherein the decantation system further comprises a secondary passage closed by a movable flap, disposed in parallel with the jet pump allowing increasing a passage area of the flow of the blow-by gas.

3. The decantation system according to claim 1, wherein the jet pump comprises a check valve.

4. The decantation system according to claim 2, wherein the decantation system comprises an aperture sealed by a movable flap, the aperture delimiting the secondary passage towards the separator device.

5. The decantation system according to claim 1, wherein the decantation system comprises a wall, an upstream face of the wall physically receives the conduit and a downstream face of the wall physically receives the separator device, the conduit and the separator device being in communication by an opening formed in the wall.

6. The decantation system according to claim 5, wherein the conduit is integrally molded with the wall.

7. The decantation system according to claim 1, wherein the decantation system comprises a wall, an upstream face of the wall physically receives the conduit and a downstream face of the wall physically receives the separator device, the conduit and the separator device being in communication by an opening formed in the wall, and wherein the opening has a semi-circular upper area and a trapezoidal lower area, the semi-circular upper area facing the conduit whereas the trapezoidal lower area faces the opening.

8. The decantation system according to claim 4, wherein the decantation system comprises a wall, an upstream face of the wall physically receives the conduit and a downstream face of the wall physically receives the separator device, the conduit and the separator device being in communication by an opening formed in the wall, and wherein the decantation system comprises a wall of material which extends between an external face of the conduit and the wall in which is formed the aperture forming the secondary passage.

9. The decantation system according to claim 2, wherein the movable flap is held in a closed position by gravity.

10. The decantation system according to claim 1, wherein the separator device comprises a valve provided with decantation means separating the droplets and a clean gas.

11. An internal combustion engine comprising a decantation system according to claim 1.

12. The decantation system according to claim 2, wherein the jet pump comprises a check valve.

13. The decantation system according to claim 1, wherein the decantation system comprises an aperture sealed by a movable flap, the aperture delimiting a secondary passage towards the separator device.

14. The decantation system according to claim 3, wherein the decantation system comprises an aperture sealed by a movable flap, the aperture delimiting a secondary passage towards the separator device.

15. The decantation system according to claim 2, wherein the decantation system comprises an aperture sealed by a movable flap, the aperture delimiting the secondary passage towards the separator device.

16. The decantation system according to claim 12, wherein the decantation system comprises an aperture sealed by a movable flap, the aperture delimiting the secondary passage towards the separator device.

17. The decantation system according to claim 16, wherein the decantation system comprises a wall, an upstream face of the wall physically receives the conduit and a downstream face of the wall physically receives the separator device, the conduit and the separator device being in communication by an opening formed in the wall.

18. The decantation system according to claim 17, wherein the conduit is integrally molded with the wall.

\* \* \* \* \*